Dec. 31, 1957 WAYNE H. CHEN ET AL 2,818,554

THREE-STATE MAGNETIC CORE CIRCUITS

Filed Sept. 15, 1954 2 Sheets-Sheet 1

INVENTORS: W. H. CHEN
C. Y. LEE

BY [signature]

ATTORNEY

INVENTORS: W. H. CHEN
C. Y. LEE

BY

ATTORNEY

United States Patent Office 2,818,554 Patented Dec. 31, 1957

2,818,554

THREE-STATE MAGNETIC CORE CIRCUITS

Wayne H. Chen, Rego Park, N. Y., and Chi-Yuan Lee, Newark, N. J., assignors to Bell Telephone Laboratories, Incorporated, New York, N. Y., a corporation of New York Application September 15, 1954, Serial No. 456,282

17 Claims. (Cl. 340—174)

Figure 1:
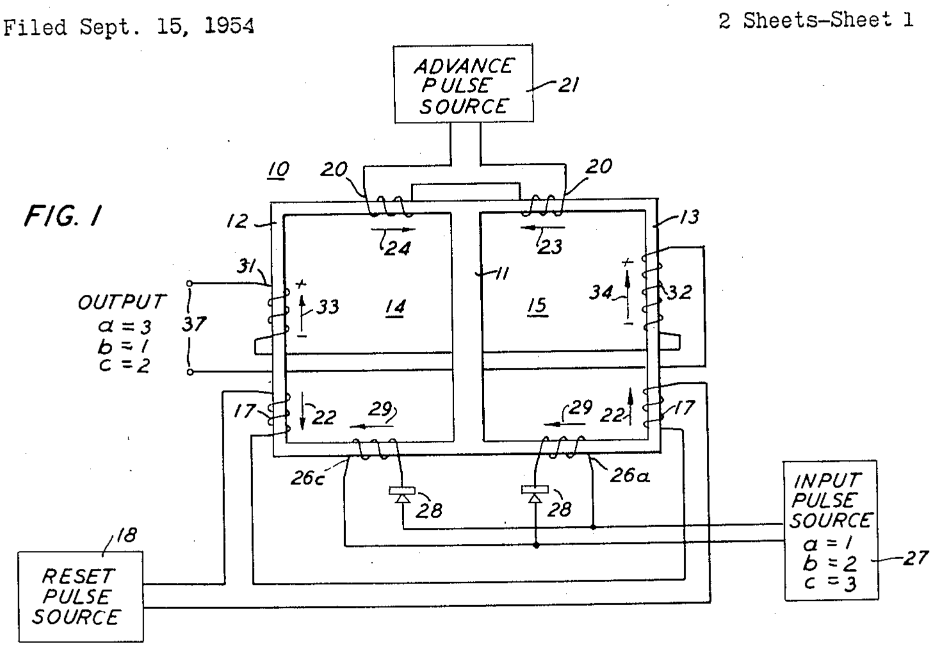

This invention relates to electronic switching circuits and more particularly to three-state magnetic core circuits.

Since the introduction of concepts of symbolic logic into the field of digital control, much work has been done on the application of various types of switching algebras to the analysis and synthesis of two terminal magnetic switching networks, both relay and core, and electronic switching networks; one of the more popular switching algebras is that known as Boolean algebra discussed, inter alia, in chapter 5 of "The Design of Switching Circuits," by W. Keister, A. E. Ritchie, and S. H. Washburn (D. Van Nostrand Co., Inc., New York, 1951). In general, a switching network involves not only a network configuration and the switching elements but also the states of transmission through the network. Priorly it has been generally, though usually tacitly, assumed that the states of transmission through a switching network were limited to two values. For relays the two states are usually the establishment and the opening of a direct current path through the network; for electronic gates these two states are usually the presence and absence of a pulse. An essentially similar situation prevails on the states of the switching elements in a network. For relays, a relay contact is either open or closed; for electronic gates, an input or an output lead either carries a pulse or does not carry one. In short, most of the switching networks that have thus far been considered are what can be referred to as 2-valued-transmission, 2-valued-switching networks.

However, there are actually many other types of switching networks. One notable and well known exception to the above described class of switching networks is the 2-valued-transmission, *n*-valued-switching network of which the step-by-step switch serves as an example. Additionally, by employing an *n*-valued algebra there can be set up the requirements for an *n*-valued-transmission, *n*-valued-switching network. This algebra is modeled after the many valued algebra introduced by E. L. Post, "Introduction to a General Theory of Elementary Propositions," American Journal of Mathematics, vol. 43, pp. 163–185 (1921), and hence is known as Post algebra. It is beyond the scope of this discussion to discuss fully the various definitions, postulates, theorems, truth tables, etc., of this algebra. For present purposes it is sufficient to note that by means of Post algebra electronic switching networks having more than two values can be analyzed in the same manner as by the two-valued Boolean algebra.

The most valuable logic other than a two-state logic is a three-state logic. In an electronic switching network, these three states can be identified in terms of a positive pulse, which we shall refer to as ternary "1," the absence of a pulse, which we shall refer to as ternary "2," and a negative pulse, which we shall refer to as ternary "3." To facilitate this discussion we shall define a function P such that $a=1$, $b=2$, $c=3$. A complete ternary logic can be set up employing certain operators acting upon P to attain other desired functions. Some of these operators are similar to those priorly well known, such as diode logic circuits, including And and Or circuits, negation circuits, comprising a transformer whose output is a pulse of opposite polarity to its input, and magnetic core joint denial circuits, of the type described in Patent 2,779,934, issued January 29, 1957, of R. C. Minnick. As an example, we can define an operator "—" which negates the input information. If we consider the operator "—" and the input function P having values $a=1$, $b=2$, $c=3$, where "1," "2," and "3" are as defined above, the output function —P will have values $a=3$, $b=2$, and $c=1$; it can readily be seen that a transformer will function as such an operator. As another example, let us consider an operator $H_1$ such that for the function P inputs $a=1$, $b=2$, $c=3$ the function $H_1(P)$ outputs are $a=1$, $b=2$, $c=3$; it can readily be shown that a simple magnetic core circuit in which only a positive pulse applied to the input winding will set the core will function as this operator. As a further example, let us consider the operator $H_2$ such that for function P inputs $a=1$, $b=2$, $c=3$ the function $H_2(P)$ outputs attained are $a=2$, $b=1$, $c=2$. This operator can be attained by the combination of a bridge circuit and a joint denial magnetic core circuit whose set winding is connected to the bridge circuit so that the application of either a positive or a negative pulse to the bridge network will cause a set pulse to be applied to the set winding of the core circuit. As a joint denial circuit only generates an output pulse in the absence of an input pulse to its set winding, an output pulse will only appear when the input has a value ternary "2"; for inputs of ternary value "1" or "3" no output pulse will be generated and thus the output will be of ternary value "2."

By operators such as these described above and those described below in accordance with this invention, the ternary logic can be realized for the various propositions of Post algebra.

Three-state memory and delay may be attained advantageously by employing three-state magnetic core circuits. Such a circuit comprises a magnetic core having a center leg of larger cross section than two outer legs, the three legs defining two magnetic circuits with a common center path. The core is of a magnetic material having a substantially rectangular hysteresis loop characteristic, as is known in the art, and advantageously has a symmetry with respect to the center leg. Such a core may be utilized as a three-state storage device by having an input winding on at least one leg, series connected advance windings on the outer legs, and series connected output windings on the outer legs; thus each magnetic circuit includes an advance, input, and output winding.

In a simple three-state magnetic core, as just described, the two circuits are initially magnetized in the same direction. When an input pulse is applied to the input winding on the center leg it will change the magnetic state of one of the two circuits depending on whether it is a positive or negative pulse, and thus on whether it has a value ternary "1" or ternary "3." If no pulse is applied, for ternary "2," the magnetic states of the circuits are unchanged. Now when an advance pulse is applied to both circuits it will shift the magnetic state of that circuit which had information stored in it by the input pulse. The output windings are wound on the core so that a negative output pulse is generated on switching of the magnetic state of the circuit in which a negative pulse is stored and a positive output pulse is obtained on switching of the magnetic state of the other circuit in which a positive pulse is stored. No output pulse is obtained when no input pulse is applied to the core circuit.

Accordingly ternary information may be stored in a three-stage magnetic core, the output of the core being the same as the input. This is a simple storage operator which repeats the input information.

A pair of three-state magnetic cores may be utilized in a three-state delay line by employing two-state delay lines between the two three-state cores; alternatively a number of three-state magnetic cores may be utilized in a three-state delay line by employing saturable core gates between the three-state cores.

An important circuit for the realization of three-state logic systems is a three-valued connector in which any one of three possible sources of information, each of which may assume any one of the ternary values, can be connected to a single output or work circuit. A connector and selector circuit utilizing a saturable magnetic core circuit to attain this is described in Patent 2,733,424 issued January 31, 1956, to W. H. Chen.

It is an object of this invention to provide circuit operators for three-state logic circuits and for three-valued transmission, three-valued switching networks.

It is another object of this invention to provide novel three-state magnetic core circuits.

In specific illustrative embodiments of this invention, a three-state magnetic core circuit comprises a pair of magnetic circuits advantageously utilizing a common center leg and each comprising magnetic material having a substantially rectangular hysteresis loop. One of the circuits has coupled thereto at least a reset, advance, and an output winding and the other of the circuits has coupled thereto at least an input, advance, and output winding; the two advance windings are connected in series to a common source of advance pulses so as to be pulsed simultaneously. In accordance with an aspect of this invention, the two output windings are wound oppositely on the core so that a voltage of one polarity, with respect to a pair of output terminals, is induced in one of the output windings and a voltage of the opposite polarity is induced in the other, on application of the advance pulse to the circuits. The two output windings are thus connected in series opposition. In accordance with another aspect of this invention, the output winding coupled to or on the other magnetic circuit, referred to above, has more turns than the output winding on the one magnetic circuit; advantageously to obtain output signals at the output terminals of uniform magnitude, the output winding of the other magnetic circuit has substantially twice the number of turns of the output winding of the one magnetic circuit.

In certain embodiments of this invention, each circuit may have an input winding; similarly a reset winding may be coupled to each of the circuits. Advantageously, the input winding or windings are arranged so that on application of ternary valued input pulses, which may comprise positive pulses, no pulse, or negative pulses, only one of the two magnetic circuits will have its state of magnetization shifted. If two input windings are employed, they may be connected in parallel, each input winding having a diode in series therewith so that only an input pulse of one polarity is applied thereto. Accordingly, in these embodiments of the invention only input pulses of value ternary "1" are applied to one of the input windings and thus to one of the magnetic circuits and only input pulses of value ternary "3" are applied to the other of the input windings and thus to the other of the magnetic circuits.

By predetermining the direction of magnetization determined in the two magnetic circuits on application of various pulses to these circuits and by predetermining which of the input pulses is applied to the two circuits of the three-state magnetic core, different ternary logical operators can be attained.

In one specific illustrative embodiment of this invention, an operator, which we can designate by a double prime, is obtained, the operator being such that for function P inputs $a=1$, $b=2$, $c=3$ the function P″ outputs of the circuit are $a=3$, $b=1$, $c=2$; this operator thus serves to cycle the inputs by one value.

In another specific illustrative embodiment of this invention, an operator, which we can designate as $J_1$, is obtained, the operator being such that for function P inputs $a=1$, $b=2$, $c=3$ the function $J_1(P)$ outputs of the circuit are $a=1$, $b=3$, $c=3$; this operator thus serves to repeat the inputs for ternary "1" and "3" but to transform the input for ternary "2" to ternary "3."

In still another specific illustrative embodiment of this invention, an operator, which we can designate as $J_2$, is obtained, the operator being such that for function P inputs $a=1$, $b=2$, $c=3$ the function $J_2(P)$ outputs of the circuit are $a=3$, $b=1$, $c=3$. It can also be shown that these same outputs can be obtained if the outputs of the first embodiment are applied to the inputs of the second embodiment of this invention. Thus the function $J_2(P)$ is equivalent mathematically to the function $J_1(P'')$.

In accordance with a feature of this invention, a three-state magnetic core circuit comprises a pair of distinct magnetic circuits, each having an output winding thereon, the output windings being connected in series and one of the output windings having a larger number of turns than the other. Specifically, in accordance with a feature of certain embodiments of this invention, the one output winding has substantially twice the number of turns of the other and the two output windings are wound on their respective magnetic circuits and connected in series so that the voltages induced therein on application of an advance pulse simultaneously to each circuit are in series opposition. By providing the one output winding of substantially twice the turns of the other winding the magnitude of the positive and negative output pulses of the three-state core circuit may be substantially the same.

It is a further feature of this invention that the two magnetic circuits of the three-state core circuit have their directions of magnetization determined by the application of input pulses thereto to attain specified transformations of the ternary input values. More specifically, it is a feature of this invention that for any ternary values of the input function only one of the two magnetic circuits can have its direction of magnetization switched.

It is a further feature of this invention that at least one of the two magnetic circuits of the three-state core circuit includes a reset winding to which a reset pulse is applied to set the core in the direction of magnetization opposite to that determined by the advance pulse applied to the advance winding of that core circuit.

It is another feature of this invention that one magnetic circuit include a reset winding serving to set the core in the opposite direction to the advance pulse applied thereto and the other magnetic circuit of the three-state magnetic core circuit include the output winding having the larger number of turns.

A complete understanding of this invention and of these and other features thereof may be gained from consideration of the following detailed description and the accompanying drawing, the three figures of which are schematic representations of different three-state magnetic core circuits in accordance with this invention to attain different operators for a three-state logic system.

Fig. 1 is a schematic representation of one specific illustrative embodiment of this invention as a three-state switching circuit for transforming the input function P to the output function P″ where the operator, designated by the double prime, is defined as described above. Specifically, for input values $a=1$, $b=2$, $c=3$, the respective output values are $a=3$, $b=1$, $c=2$ where a ternary "1" is defined as a positive pulse, a ternary "2" as the absence of a pulse, and a ternary "3" as a negative pulse.

The circuit comprises a three-state magnetic core 10 having a center leg 11 of larger cross section, and therefore smaller magnetic reluctance, than the outer legs 12 and 13. Advantageously, the core 10 has a symmetry with respect to the center leg 11. The core 10 is of a magnetic material having a substantially rectangular hysteresis loop so that information may be stored in either magnetic circuit 14 or 15 of the core by leaving the circuit in one of two states of remanent magnetization.

A reset winding 17 is coupled to each of the circuits 14 and 15 and connected to a reset pulse source 18. Similarly an advance winding 20 is coupled to each magnetic circuit and connected to an advance pulse source 21. The reset 17 windings are wound on the core 10 so that current flowing through them tends to switch the magnetic circuits 14 and 15 in the direction of magnetization indicated by the arrows 22; in this embodiment it has been assumed that the reset pulse will tend to set each circuit in a counterclockwise state of magnetization. The advance pulses tend to set the magnetic circuit 15 in a counterclockwise direction, as indicated by the arrow 23, but the circuit 14 in a clockwise direction, as indicated by the arrow 24. In circuit 14 the reset and advance pulses thus tend to magnetize the core in the opposite directions so that the circuit operates as a Joint Denial circuit, as further described in Patent 2,779,934, issued January 29, 1957, of R. C. Minnick, whereas in circuit 15 the reset and advance pulses tend to magnetize the core in the same direction.

An input or set winding 26 is coupled to each of the magnetic circuits 14 and 15, the two windings 26 being connected in parallel and to an input pulse source 27. The ternary information to be applied to the three-state core may advantageously take the form, as described above, of a positive pulse for ternary "1," no pulse for ternary "2," and a negative pulse for ternary "3." In this embodiment of the invention, diodes 28 are connected in series with the input windings 26 so that a positive pulse for ternary "1" is only applied to the winding 26 of the magnetic circuit 15 and a negative pulse for ternary "3" is only applied to the winding 26 of the magnetic circuit 14. The application of these input pulses to the windings 26 tends to set the state of magnetization of the core in a clockwise direction, as indicated by the arrows 29.

An output winding 31 is coupled to the magnetic circuit 14 and an output winding 32 to the magnetic circuit 15. Output winding 32 advantageously has twice as many turns as output winding 31, in accordance with one aspect of this invention as described more fully below. The arrows 33 and 34 adjacent the windings 31 and 32 indicate not flux but the direction or polarity of the induced voltage on switching of the state of the core by the advance pulse.

An understanding of the operation of this embodiment of the invention can be gained from consideration of the three transformations attained. Let us consider first the case where the input information is a ternary "1," which we have defined as a positive pulse. The normal state of the magnetic circuits 14 and 15, after application of a reset pulse from source 18 to reset windings 17, is with a counterclockwise direction of magnetization. A positive pulse is applied only to the input winding 26 of circuit 15, due to the poling of the diodes 28. As indicated by arrow 29, this pulse reverses the direction of magnetization in circuit 15. When the advance pulse is applied, the direction of magnetization is again reversed and an output pulse appears on output winding 32. However, the advance pulse also reverses the direction of magnetization of the magnetic circuit 14 so that an output pulse also appears at output winding 31. While the two induced output voltages are connected in series opposition, the output winding 32 advantageously has twice the number of turns of the output winding 31, thereby offsetting the extraneous pulse induced in the output winding 31. The output pulse appearing at the output terminals 37 is a negative pulse which we have assumed to represent ternary "3." We have thus transformed the value *a* from *a* equal to ternary "1" to *a* equal to ternary "3."

As noted above for the particular logical operator defined by the embodiment of Fig. 1, it is also desired to transform the value *b* from *b* equal to ternary "2" to *b* equal to ternary "1," i. e., when no pulse appears at the input from source 27, a positive pulse is to appear at the output terminals 37.

When no pulse is applied to the input windings 29, both circuits 14 and 15 are left in the magnetic states determined by the reset pulse and in this embodiment both circuits will remain with a counterclockwise direction of magnetization. Application of the advance pulse to the advance winding 20 of circuit 15 will not switch the state of magnetization of that circuit as the advance and reset pulses tend to set the core in the same direction of magnetization. Application of the advance pulse to the advance winding of core 14 will, however, switch the state of magnetization of the core causing an output pulse to be generated in output winding 31. A positive output pulse will therefore appear at the output terminals 37.

The third transformation to be obtained by the embodiment depicted in Fig. 1 is to transform the value *c* from *c* equal to ternary "3" to *c* equal to ternary "2," i. e., when a negative pulse is applied from source 27 to input windings 29, no pulse should appear at the output terminals 37. When a negative pulse is applied from source 27, input pulse current flows only through the input winding 29 of magnetic circuit 14, due to the diodes 28. This input pulse will reverse the direction of magnetization of the core which had been determined by the last reset pulse. As the advance pulse and the input pulse tend to determine the same direction of magnetization of the core in magnetic circuit 14, no output pulse will appear at terminals 37 on application of the advance pulse to magnetic circuit 14. We have already seen that, when no pulse is applied to the input winding 29 of the magnetic circuit 15, no output pulse is generated in the output winding 32. Accordingly there will be no output pulse at terminals 37 when a negative pulse is applied to the input windings of the core.

Figure 2:
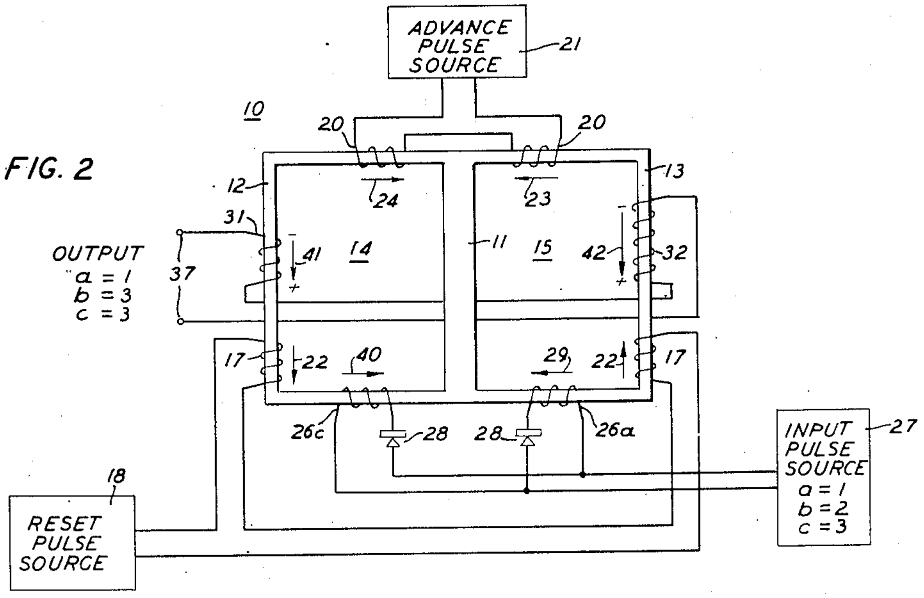

The embodiment depicted in Fig. 2 serves to transform the input function P for which $a=1$, $b=2$, $c=3$ to the output function $J_1(P)$ for which $a=1$, $b=3$, $c=3$. This circuit is basically similar to that of Fig. 1 and to facilitate an understanding of the circuit the same reference numerals are employed for common elements. The distinction between the two circuits is that the direction of the input winding 29 coupled to the magnetic circuit 14 is reversed so that an input pulse through the winding tends to determine the magnetization of circuit 14 in a counterclockwise direction, as indicated by the arrow 40, and thus in the same direction as the reset pulse; in the embodiment of Fig. 1 the opposite was true. Additionally, the output windings 31 and 32 are wound on their cores in the opposite directions to that of the embodiment of Fig. 1 so that the polarity of the induced voltages in these windings is indicated in Fig. 2 by the arrows 41 and 42.

When the input pulse has the value *a* equal to ternary "1," the operation of this circuit is the same as that of the embodiment of Fig. 1, except that, due to the reversal of the winding of the output windings 31 and 32, a positive pulse appears at the output terminals 37.

When the input value is *b* or *c*, i. e., is ternary "2" or ternary "3" as represented by no pulse or a negative pulse, the magnetic circuit 15 is unaffected and, as the arrows 22 and 40 of Fig. 14 are in the same direction, the operation of magnetic circuit 14 is the same for the two cases. In each case the core will be set with its magnetization in a counterclockwise direction when the advance pulse is applied to the advance winding 20; as this advance pulse tends to set the core in a clockwise direction, as indicated by the arrow 24, the magnetic state of the circuit will be shifted and an output will appear across the output winding 31. As the output winding 31 is wound to produce a negative pulse, in this embodiment, the output at the terminals 37 will, in each case, be a negative pulse, indicative of ternary "3." Thus at the output both the values *b* and *c* will be equal to ternary "3."

Figure 3:
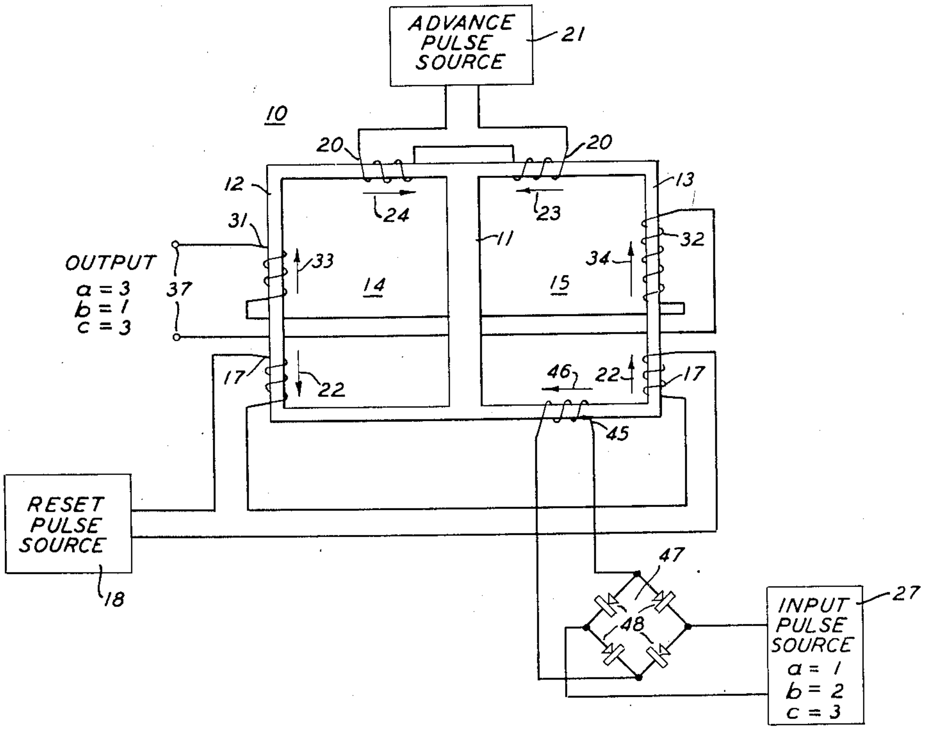

The specific embodiment depicted in Fig. 3 serves as the operator $J_2$ which transforms the P function inputs $a=1$, $b=2$, $c=3$ to the $J_c(P)$ function outputs $a=3$, $b=1$, $c=3$. In this embodiment the input pulses from source 27 are applied to a single input winding 45 coupled only to the magnetic circuit 15 by means of a diode bridge network 47 including diode or other unidirectional current elements 48. In this manner either a positive input pulse, for ternary "1," or a negative input pulse, for ternary "3," will cause the direction of magnetization of the magnetic circuit 15 to be as indicated by the arrow 46, opposite to that of the advance pulse applied to circuit 15.

Accordingly, when the input value is either ternary "1" or ternary "3," output pulses are generated in both output windings 31 and 32 on application of the advance pulse to the advance windings 20. As the output windings are connected in series opposition and the output winding 32 has more turns than the output winding 31, the output pulse appearing at terminal 31 is a negative pulse. When no input pulse is applied, representing an input value of ternary "2," an output pulse is only generated in the output winding 31 and the resultant pulse appearing at the output terminals 37 is a positive pulse, representing the binary value "1."

It should be noted that the function $J_2(P)$, for which $a=3$, $b=1$, $c=3$, can also be obtained by utilizing the output of the embodiment of Fig. 1 as the input of the embodiment of Fig. 2, i. e., connecting the two circuits in tandem. Mathematically this can be stated by noting that $J_2(P)$ is equal to $J_1(P'')$.

It should be noted that in each of these embodiments the reset winding 17 may be omitted from the magnetic circuit 15 as it serves to put the core in the same state of magnetization as the advance winding. While, as above, we have considered the sequence of operation of these circuits to be the application of reset, input, and advance pulses, actually this sequence is continuously repeated so that the advance pulse of a prior operation can also serve to reset the circuit for the next operation.

While only three specific embodiments have been disclosed, it is believed obvious to those skilled in the art how further operators may be attained for three-state logic systems by reversing the direction of certain of the windings and by further variations in the input circuits. Accordingly it is to be understood that the above-described arrangements are illustrative of the principles of the invention. Numerous other arrangements may be devised by those skilled in the art without departing from the spirit and scope of the invention.

What is claimed is:

1. A three-state magnetic core circuit for a three-state logic system comprising magnetic core means having a substantially rectangular hysteresis characteristic and defining a pair of magnetic circuits, each of said magnetic circuits having an advance winding and an output winding, the output winding of one of said circuits having more turns than the output winding of the other of said circuits, means including a reset winding coupled to said other circuit for determining the magnetization of said other circuit in one direction, means including an input winding coupled to at least one of said circuits for determining the direction of magnetization of at least one of said circuits in response to ternary valued input information, means applying advance pulses simultaneously to said advance windings, said advance pulse applied to said advance winding of said other circuit determining the magnetization of said other circuit in the opposite direction, output terminals, and means connecting said output windings in series opposition and to said output terminals, whereby a pulse of either polarity or no pulse appears at said terminals depending upon the ternary value of said input information.

2. A three-state magnetic core circuit in accordance with claim 1 wherein said output winding of said one circuit is substantially twice the number of turns of said output winding of said other circuit.

3. A three-state magnetic core circuit comprising magnetic core means having a substantially rectangular hysteresis characteristic and defining a pair of magnetic circuits each having an input winding, advance winding, and output winding, the output winding of one of said circuits having more turns than the output winding of the other of said circuits, means including a reset winding for determining the direction of magnetization of said other circuit in one direction, means applying pulses of either polarity simultaneously to said input windings, diode means connected to said input windings whereby a current due to a pulse of one polarity flows through only one of said input windings and a current due to the pulse of the other polarity flows through only the other of said input windings, means applying advance pulses simultaneously to said advance windings, output terminals, and means connecting said output windings in series opposition and to said output terminals whereby a pulse of either polarity or no pulse appears at said output terminals depending upon whether a pulse of either polarity or no pulse was applied to said input windings.

4. A three-state magnetic core circuit in accordance with claim 3 wherein said magnetic core means comprises a single magnetic core having a pair of output legs and a common larger center leg.

5. A three-state magnetic core circuit in accordance with claim 3 wherein said output winding of said one circuit has substantially twice the number of turns of said output winding of said other circuit.

6. A three-state magnetic core circuit in accordance with claim 3 wherein said one circuit is magnetized by said advance pulse in the opposite direction than by the input pulse applied thereto and said other circuit is magnetized in the opposite direction by said advance pulse than by said reset pulse applied thereto.

7. A three state magnetic core circuit in accordance with claim 3 wherein said other magnetic circuit is magnetized by said input and advance pulses in one direction and by said reset pulse in the other direction, and said one magnetic circuit is magnetized by said advance pulse in one direction and by said input pulse in the opposite direction.

8. A three-state magnetic core circuit comprising magnetic core means having a substantially rectangular hysteresis characteristic and defining a pair of magnetic circuits each having an advance and an output winding and the output winding of one of said circuits having more turns than the output winding of the other of said circuits, means for applying advance pulses simultaneously to said advance windings, means including a reset winding on said other circuit for determining the direction of magnetization of said other circuit opposite to that determined by an advance pulse applied to said advance winding of said other circuit, an input winding on said one circuit, means for applying input pulses to said input winding to determine the direction of magnetization of said one circuit in the same direction for both positive and negative applied pulses, an output terminal, and means connecting said output windings in series opposition and to said output winding whereby the ternary value of the output signal at said output terminals is dependent on the ternary value of the input signal to said input pulse means.

9. A three-state magnetic core circuit in accordance with claim 8 wherein said input pulse means includes a bridge circuit comprising a plurality of unidirectional current elements.

10. A three-state magnetic core circuit in accordance with claim 8 wherein said output winding of said one circuit has substantially twice the turns of said output winding of said other circuit.

11. A three-state magnetic core circuit for employment in a three-state logic system comprising magnetic core means having a substantially rectangular hysteresis characteristic and defining a pair of magnetic circuits, each of said circuits having an advance winding and an output winding, the output winding of one of said circuits having more turns than the output winding of the other of said circuits, means including a reset winding on said other circuit for determining the magnetization of said other circuit in one direction, a source of ternary valued input pulses, means including at least one input winding for applying said input pulses to said magnetic circuits so that the direction of magnetization of no more than one of said circuits is switched for any one value input pulse, means applying advance pulses simultaneously to said advance windings, output terminals, and means connecting said output windings in series opposition and to said output terminals whereby a pulse of either polarity or no pulse appears at said output terminals depending on the ternary value of the input pulse applied to said circuits.

12. A three-state magnetic core circuit in accordance with claim 11 wherein said advance pulse applied to said advance winding of said other circuit determines the direction of magnetization of said other circuit in the opposite direction to said reset pulse and said advance pulse applied to said advance winding of said one circuit determines the direction of magnetization of said one circuit in the opposite direction than said input pulse applied to said one circuit.

13. A three-state magnetic core circuit in accordance with claim 11 wherein said output winding of said one circuit has substantially twice the number of turns of said output winding of said other circuit.

14. A three-state magnetic core circuit in accordance with claim 13 wherein said means for applying input pulses to said magnetic circuits includes an input winding on each of said magnetic circuits and diode means in series with said input windings and poled to allow only pulses of one polarity to be applied to one of said magnetic circuits and only pulses of the opposite polarity to be applied to the other of said magnetic circuits.

15. A three-state magnetic core circuit in accordance with claim 14 wherein said input pulse applied to the input winding of said other magnetic circuit serves to determine the direction of magnetization of said other circuit in the opposite direction to said reset pulse and said input pulse applied to the input winding of said one magnetic circuit serves to determine the direction of magnetization of said one circuit in the opposite direction to said advance pulse applied to the advance winding of said one circuit.

16. A three-state magnetic core circuit for employment in a three-state logic system comprising a pair of magnetic circuits each comprising core means having a substantially rectangular hysteresis characteristic, an advance winding, a reset winding, and an output winding on one of said circuits, an advance winding, an input winding, and an output winding on the other of said circuits, said output winding of said other circuit having more turns than said output winding of said one circuit, means for applying a reset pulse to said reset winding, means for applying ternary valued input pulses to said input winding, means for applying advance pulses simultaneously to said advance windings, a pair of output terminals, and means connecting said output windings in series opposition and to said output terminals whereby a pulse of either polarity or no pulse appears at said terminals depending upon the ternary value of said input information.

17. A three-state magnetic core circuit in accordance with claim 16 wherein said output winding of said other circuit has substantially twice the number of turns of said output winding of said one circuit.

References Cited in the file of this patent

UNITED STATES PATENTS

| | | |
|---|---|---|
| 2,614,167 | Kamm | Oct. 14, 1952 |
| 2,673,337 | Avery | Mar. 23, 1954 |
| 2,695,993 | Haynes | Nov. 30, 1954 |